UNITED STATES PATENT OFFICE.

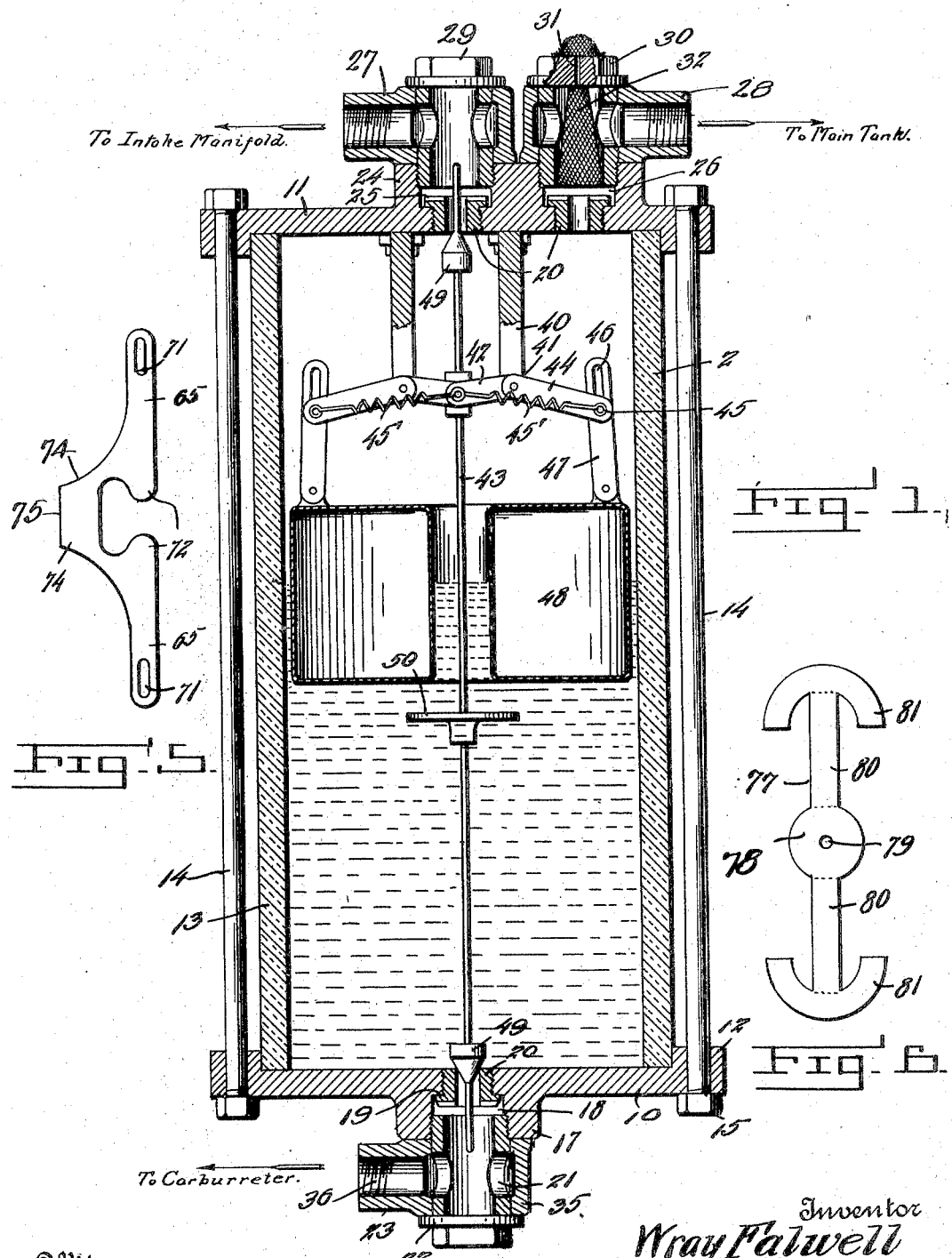

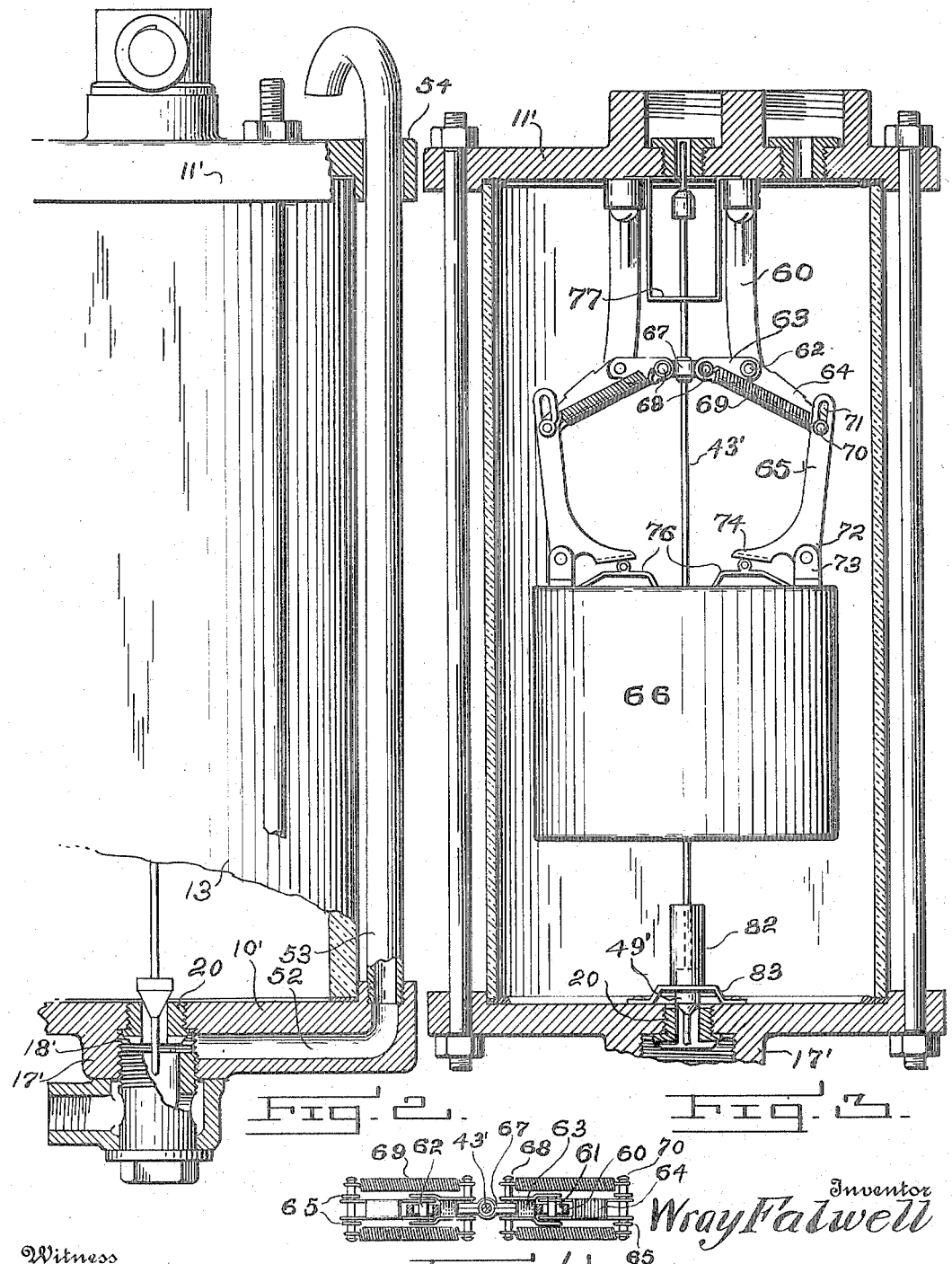

WRAY FALWELL, OF FITCHBURG, MASSACHUSETTS.

VACUUM FUEL-FEED SYSTEM.

1,249,939.      Specification of Letters Patent.    Patented Dec. 11, 1917.

Application filed April 28, 1916. Serial No. 94,093.

*To all whom it may concern:*

Be it known that I, WRAY FALWELL, a citizen of the United States, residing at Fitchburg, in the county of Worcester and State of Massachusetts, have invented certain new and useful Improvements in Vacuum Fuel-Feed Systems, of which the following is a specification.

The invention has for an object to give a simplified method of constructing a fuel feed system for automobiles in which the fuel is raised by the engine suction operating on the principle of that shown in the patent to Jay, numbered 1,125,549. It is a special object to simplify the construction of this device and its action, and reduce the number of elements essential to its operation.

Thus, in my device I have a single unitary valve device to control the intermittent filling of a supplementary fuel tank, and discharge thereof, obviating the necessity for compensating or adjusting devices to insure proper action of the controlling valve. I also have so simplified the construction of the device that in manufacture only one form of connection and port element communicating with the auxiliary tank are required, as well as a single form of valve.

I have made the discovery that great positiveness in action may be secured without the use of a valve controlling the inlet of air to the auxiliary tank, and by properly proportioning the connection with the engine intake and the air inlet of the auxiliary tank, I have found it possible to take advantage of the elasticity of the air as well as the frictional resistance to rapid tortuous movement to induce flow of fuel from the main tank to the auxiliary tank by producing a vacuous condition in the auxiliary tank while the air vent is open. At the same time I also locate the air inlet that when the vacuous condition is produced in the auxiliary tank it performs the function of an injector assisting in inducing the flow of fuel from the main tank.

I also enable the construction of the device by the use of parts of extremely simple construction requiring no nicety of adjustment, other than the familiar snug seating of valves.

Additional objects and advantages and features of invention may appear from the construction, arrangement and combination of parts in the device embodied in this application as described and shown in the drawings, where—

Figure 1 is a vertical sectional view of one form of the device as used.

Fig. 2 is a fragmentary view showing a check valve, at the outlets.

Fig. 3 is a view similar to Fig. 1 showing the device empty,

Fig. 4 is a detail plan of the connections between the float and valve,

Fig. 5 is a detail of the blank for the links 65,

Fig. 6 is a plan of the blank for the yoke 77.

There is illustrated an auxiliary tank device suitable for use in a system such as that shown in the Jay patent before mentioned and also as indicated in the patent to Higginson & Arundel numbered 1,067,814, having connections for ducts leading respectively to the intake manifold of an engine, a main fuel tank and the carbureter, and in view of this familiarity with the principle of the use of the device, the main fuel tank, the engine and carbureter are not illustrated, the respective connections therefor being suitably indicated on the drawings and explained in detail herein.

The tank comprises a lower plate 10, and an upper plate 11, which may be cast or otherwise formed of any suitable metal, suitable retaining flanges 12 being formed on each, within which are set respective ends of a glass cylinder 13, which may have any suitable form of gasket interposed between itself and the plates. Suitable portions are formed around both of the plates receiving rods 14 having engaged thereon nuts 15, by which the plates are clamped upon the cylinder 13. The lower plate 10 is formed with a central boss 17 on the lower side, through which there is formed a fuel outlet opening 18 communicating with the interior of the tank. This opening is slightly reduced at its inner part forming a shoulder 19, the reduced and large parts of the openings being suitably threaded. In the reduced part there is engaged a bushing 20, while in the outer part of the opening there is engaged a hollow bolt 21 having a flanged head 22 at the outer part by which a swivel fuel connection 23 is clamped upon the boss. This connection is used to connect a feed pipe with the tank, extending to the carbureter.

The top plate 11 is formed with an oblong boss 24, having suitable openings 25 and 26 therethrough enlarged and threaded in the same way as the opening 18 through the bottom plate, bushings 20 being engaged in the inner parts of the openings and swivel connections 27 and 28 being secured over respective openings 25 and 26 by means of hollow bolts 29 and 30, the swivel connections and bolts last named being similar in form to the connections 21 and 23 before described, with the exception that the bolt 30 has a small air vent 31 centrally therethrough, the diameter of which in practise has been made about one thirty-secondth of an inch, although it may be made larger without detriment. A small basket strainer 32 is also provided in the bolt 30. Each of the swivel connections comprises a circular chamber portion 35, having a circular space therein somewhat larger than the body of the bolt by which it is secured, from which leads the nipple 36, adapted for connection to the usual feed piping, and having communications with the interior of the chamber 35. The swivel connections have parallel ground inner and outer faces, the one engaged against the boss upon which it is secured, while the other is engaged snugly by the retaining flange of the hollow bolt. The bosses 17 and 24 are also ground to a plane surface so that a tight joint may be made with the swivel connection in any position by simply tightening the bolt. Each of the bolts have lateral openings therein communicating with the interior of the chamber portion 35 of the swivel connection. It is an advantage of the formation of my top plate that one operation with a single tool is sufficient to provide the seat for both of the swivel connections thereon, the boss 24 having a continuous planiform outer face. This boss is located suitably to permit formation of the passage 25 concentrically with the cylinder 12, and the opening 26 is formed just within the cylinder 13 at one side.

Two hangers 40 are carried by the top plate 11, which may be either formed integrally therewith, or attached, as found most convenient in manufacture, being shown separate and attached in the present instance. The formation of their lower ends provides pivot ears 41 located on a diametrical plane of the bushings 20, and pivoted on each there are two short links 42, extending inwardly therefrom and having a loose pivotal connection with a double valve stem 43, while two longer links 44 are pivoted upon each ear beside the links 42, extending outwardly toward the sides of the cylinder 13. A small pin 45 is engaged transversely through the outer ends of each part of these last named links, projecting laterally beyond each, and between the links the pin engages through a longitudinal slot 46 in an upstanding link 47, pivoted on an annular float 48 loosely set within the cylinder 13.

The valve stem 43 comprises a slender rod in the neighborhood of $\tfrac{1}{16}$ of an inch thick and extends through both of the central bushings 20 at top and bottom of the device. Inwardly of the ends and spaced from each other a distance less than the distance between the bushings 20, there are two conical valves 49, adapted to seat alternately on the bushings 20, after a slight movement of the rod 43. At a suitable location on the rod a rest 50 is secured, of a suitable form to support the float 48 at the lower limit of its movement as determined. If desired any other form of rest for the float carried by some other element of the device may be provided.

While not regarded as absolutely essential, a check valve of any suitable kind may be incorporated at the outlet to the carbureter to prevent backward movement of fuel from the carbureter after the lower valve 49 is opened.

Absence of necessity for the check valve is due to the fact that opening of the lower valve will occur only after the vacant space at the upper part of the chamber has been reduced to a minimum and entrance of a comparatively small body of matter will be sufficient to relieve the vacuous condition therein. After opening of the lower valve, closing of the upper one will be practically immediate, and the momentum of fuel in the pipe from the main tank together with the rapid ingress of air through the vent 31 will quickly relieve the vacuum. There is a good margin of surplus fuel in the carbureter tank to operate the engine and allow a small quantity to be drawn to the auxiliary tank without detriment.

In use, the device being suitably connected and filled initially with fuel, which may be done by cranking of the engine with which it is associated, or by removing one of the hollow screws in the top of the device and pouring the fuel through the opening thus provided, and the engine being in operation, as the fuel becomes exhausted in the carbureter it will be supplied from my auxiliary device. All carbureters for this use have a chamber therein capable of holding gasolene to operate the engine at full speed for a minute or more. As soon as the float 48 in my device is lowered sufficiently for the upper ends of the links 47 to pass below a line through the pins 45 and the pivotal connection of the links 44 and 42, pivot ears 41 and the stem 43, the springs 45' will cause a rapid downward movement of the links 44 and more forcible downward movement of the valves 49, closing the outlet to the carbureter and opening the communication with the manifold, whereby a vacuous condition will be rapidly produced in the upper part of the chamber within the cylinder 13. Air will be drawn through the opening 31, tending to relieve the vacuous condition, but not sufficiently to prevent rapid movement of fuel from the main tank through the opening 26 and into the chamber. As the chamber is filled with fuel, the float 48 rises, and as soon as the lower end of the slot 46 passes above a line through the pivot of the links as before mentioned, the springs 45' will rapidly draw the outer ends of the links 44 upwardly until the pins 45 strike the upper ends of the slots 46, at which point the weight of the float will check the spring, and the spring being in position to exert powerful raising action upon the stem 43, will draw the stem upwardly seating the upper valve 49 and unseating the lower one. The check valve 51 will then prevent backward movement of fuel through the outlet, and the flow of fuel through the opening 26 and suction of air through the passage 31 in conjunction will rapidly relieve the vacuous condition in the chamber, after which the fuel is again free to feed to the carbureter, replenishing the supply in the usual chamber thereof and keeping it supplied until the action above described is repeated.

In practice it is found that it takes in the neighborhood of only three seconds for the auxiliary tank to fill with the use of my device under ordinary running conditions, and the slight lowering of the level of fuel in the carbureter fuel chamber due to use of fuel in the mixing action of the carbureter produces no effect upon the action of the engine.

An air relief may be provided in connection with the fuel duct from my auxiliary tank to the carbureter, as indicated in Fig. 2, where the lower plate 10' corresponding to the plate 10 before described, is formed with a cored lateral duct 52 opening into the outlet opening 18' outwardly of the bushing 20. The outer end of the duct is curved upwardly in a suitable extension of the bottom plate, opening through the upper side of the extension just without the periphery of the cylinder 13. The outer part of the duct is threaded and has screwed thereinto the lower end of a pipe 53, set loosely in a suitably apertured extension 54 of the top plate 11', corresponding to the one 11 first described. The upper end of the pipe is curved downward at a suitable height to permit its rotation for screwing of the pipe into the threaded end of the duct 52. No check valve will be required in the fuel line to the carbureter with this vent.

In Figs. 3 to 6 there are shown details of the mounting of the float as used in one form of the device. The hanger arms 60 secured to the underside of the top plate 11' have horizontal slots 61 at their lower ends in which the pins 62 connect toggle links 63 and 64 by which connection is made between the valve rod 43' and the upper ends of upstanding links 65 mounted upon the upper side of the float 66. The links 63 extend inwardly from the arm 60, and are connected to suitable ears 67 suitably fixed upon the rod 43'. There is one link 63 on each side of each arm 60, and the links are connected to the ears 67 by means of long pins 68 projecting sufficiently on each side and headed to permit ready engagement of springs 69 on each end. These springs extend outwardly and are connected to similar pins 70 extended through the outer ends of the links 64, these pins being disposed loosely in slots 71 extending longitudinally at the upper ends of the links 65. In order to insure the requisite steadiness in the float without necessity for guides, the links 63 and 64 are formed in integral pairs, each being stamped from H-shaped blanks bent to dispose the stems in parallel relation, through the extremities of which the pivot pins are rigidly engaged. The links 65 are also formed in pairs from a blank such as shown in Fig. 5 and when formed have approximately the shape of a boot as viewed from the side, being pivoted at the heel portion 72 between suitable ears 73 carried at the upper side of the float, the toe portions at each side being connected by a web portion 75 disposed at the lower side, and proportioned and located to bear upon bow springs 76 mounted upon the upper side of the float, this engagement occurring when the float is at the lowest limit of its movement, and serving to check the downward movement of the float without requiring any other stop or support for the float. A guide yoke 77 is provided at the upper part of the device to steady the valve rod, comprising a central circular portion 78 having a suitable central aperture 79 therethrough to snugly receive the rod, integral arms 80 extending from each side thereof, bent upwardly, terminating in semi-circular pieces 81 bent outwardly, the ends of the semi-circular portions extending inwardly toward each other and meeting to form an annulus. The top plate 11' is recessed suitably to receive this annulus snugly, and the hanger arms 60 extend across this recess closely adjacent the bases of the arms 80, so as to hold the yoke 77 firmly in place. At the lower end, the rod 43' is guided by means of a short cylinder 82 mounted upon a small bridge piece 83, through which the outlet valve 49' projects at the lower end to engage upon the seat bushing 20, the valve being extended at its upper part to lie within the cylinder 82 while seated. The operation of the last described forms of the invention is the same as first described, and elements of the several forms may be combined as found desirable.

It has been found practicable to form the top and bottom plates and the terminal connections thereon such as the swivel element 36 and the hollow bolt 22 of aluminum to advantage.

What is claimed:

1. In a fuel feed for charge forming devices for machines in which a vacuous condition is produced in some part, the combination of an auxiliary tank having a single chamber, duct connections thereon for connection with that part of a machine producing a vacuous condition, duct connections on said tank for admitting fuel to the auxiliary tank, duct connections thereon for carrying fuel to a charge forming device, a device in the auxiliary tank constructed and associated therewith to be moved by variations in the quantity of fuel in the tank, valves to alternately close the first and last named connections, operative connections between said device in the tank and the valves for closing of the said first named connection when the fuel is at a maximum and to close the said last named connection when the fuel is at the minimum, an air passage being formed in said tank in open communication with the atmosphere, of a size to frictionally retard air for the purpose described, and for relief of a vacuous condition produced therein, after closing of the valve at the first named connection.

2. In a device of the character described, a tank having a single chamber, an air outlet and a fuel outlet being formed and located in opposition therein, a unitary valve device movable and proportioned to alternately close the outlets, the tank having also a fuel inlet and an air inlet, both open and unobstructed, and means operated by fluid in the tank under variations of quantity to move the valve.

3. In a fuel feed for charge forming devices for machines in which a vacuous condition is produced in some part, the combination of an auxiliary tank, duct connections thereon for connection with that part of a machine producing a vacuous condition, duct connections therein for carrying fuel to a charge forming device, fuel supply connections on the tank, a device in the auxiliary tank constructed and associated therewith to be moved by variations in the quantity of fuel in the tank, valves to alternately close the first and second named connections, operative connections between said device in the tank and the valves for closing of the said first named connection when the fuel is at a maximum and to close the said last named connection when the fuel is at the minimum, an air passage being formed in said tank for relief of a vacuous condition produced therein, after closing of the valve at the first named connection, and means to check action of the device in drawing fuel in the second and third named connection, consisting of an air duct in communication with the second named connection without the valve and open to the atmosphere above a predetermined level on the auxiliary tank.

In testimony whereof I have affixed my signature in presence of two witnesses.

WRAY FALWELL.

Witnesses:
CHARLES F. BAKER,
MARY C. HALL.